US012574090B2

(12) United States Patent     (10) Patent No.:   US 12,574,090 B2
Ganguly et al.     (45) Date of Patent:     Mar. 10, 2026

(54) REPORTING CHANNEL STATE INFORMATION IN ADVANCED MIMO ANTENNA SYSTEMS FOR CELLULAR COMMUNICATIONS

(71) Applicant: Samsung Electronics Co., Ltd., Suwon-si (KR)

(72) Inventors: Shouvik Ganguly, Frisco, TX (US); Young Han Nam, Plano, TX (US); Jianhua Mo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 18/495,606

(22) Filed: Oct. 26, 2023

(65) Prior Publication Data

US 2024/0171244 A1     May 23, 2024

Related U.S. Application Data

(60) Provisional application No. 63/422,857, filed on Nov. 4, 2022.

(51) Int. Cl.
   *H04W 4/00*       (2018.01)
   *H04B 7/06*       (2006.01)
   *H04L 5/00*       (2006.01)
   *H04W 72/232*     (2023.01)

(52) U.S. Cl.
   CPC ......... *H04B 7/0626* (2013.01); *H04B 7/0632* (2013.01); *H04L 5/0051* (2013.01); *H04W 72/232* (2023.01)

(58) Field of Classification Search
   CPC .. H04B 7/0626; H04B 7/0632; H04B 7/0478; H04B 7/0639; H04B 7/0695;
      (Continued)

(56) References Cited

U.S. PATENT DOCUMENTS 12,250,041 B2 *   3/2025   Park ..................... H04B 7/0634
2017/0033852 A1   2/2017   Kim et al.
      (Continued)

OTHER PUBLICATIONS

Mihai Enescu; Keeth Jayasinghe; Karri Ranta-Aho; Karol Schober; Antti Toskala, "5G Physical Layer," in 5G Technology: 3GPP Evolution to 5G-Advanced , Wiley, 2024, pp. 87-148. (Year: 2024).*

(Continued)

*Primary Examiner* — Thai Dinh Hoang

(57) ABSTRACT

Methods and apparatuses for channel state information reporting in advanced MIMO antenna systems is provided. The method comprises: receiving information for an analog beam and an R CSI-RS resources; constructing an analog beam codebook; deriving sets of PMIs corresponding to analog beams, wherein each set of R sets of PMIs corresponds to an analog beam of the analog beams associated with the R CSI-RS resources; identifying a set of digital beams corresponding to each of the analog beams; identifying a set of hybrid beams corresponding to each of the R CSI-RS resources, wherein the set of the hybrid beams comprises the set of digital beams and the analog beam, respectively; identifying a subset of the set of hybrid beams using an index to generate a PMI corresponding to the analog beams; and transmitting a CSI report including the PMI and the subset of the set of hybrid beams.

20 Claims, 12 Drawing Sheets

(58) Field of Classification Search
    CPC .. H04B 7/0456; H04B 7/0617; H04B 7/0682;
                H04L 5/0051; H04L 5/005; H04L
            25/0224; H04W 72/232; H04W 24/08;
                H04W 24/10; H04W 72/231
    See application file for complete search history.

(56)                 References Cited

U.S. PATENT DOCUMENTS

| | | |
|---|---|---|
| 2019/0109629 A1 | 4/2019 | Park et al. |
| 2021/0126669 A1 | 4/2021 | Roberts et al. |
| 2021/0242912 A1 | 8/2021 | Zhao et al. |
| 2021/0344397 A1 | 11/2021 | Lee et al. |

OTHER PUBLICATIONS

Physical layer 5G (Year: 2024).*
International Search Report and Written Opinion issued Feb. 14, 2024 regarding International Application No. PCT/KR2023/017465, 6 pages.
"5G; NR; Physical channels and modulation (3GPP TS 38.211 version 16.2.0 Release 16)", ETSI TS 138 211 V16.2.0, Jul. 2020, 136 pages.
"5G; NR; Physical layer procedures for data (3GPP TS 38.214 version 16.2.0 Release 16)", ETSI TS 138 214 V16.2.0, Jul. 2020, 167 pages.
"5G; NR; Radio Resource Control (RRC); Protocol specification (3GPP TS 38.331 version 16.2.0 Release 16)", ETSI TS 138 331 V16.2.0, Nov. 2020, 908 pages.

* cited by examiner

REPORTING CHANNEL STATE INFORMATION IN ADVANCED MIMO ANTENNA SYSTEMS FOR CELLULAR COMMUNICATIONS

CROSS-REFERENCE TO RELATED APPLICATIONS AND CLAIM OF PRIORITY

The present application claims priority to U.S. Provisional Patent Application No. 63/422,857, filed on Nov. 4, 2022. The contents of the above-identified patent documents are incorporated herein by reference.

TECHNICAL FIELD

The present disclosure relates generally to wireless communication systems and, more specifically, the present disclosure relates to channel state information (CSI) reporting in advanced multi-input multi-output (MIMO) antenna systems in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to CSI reporting in advanced MIMO antenna systems in a wireless communication system.

In one embodiment, a user equipment (UE) is provided. The UE comprises a transceiver configured to receive information for (i) an analog beam and (ii) an R CSI-reference signal (R CSI-RS) resources. The UE further comprises a processor operably coupled to the transceiver, the processor configured to: construct, based on the information for the analog beam, an analog beam codebook, derive, based on the analog beam codebook and measurement of the R CSI-RS resources, R sets of pre-coding matrix indicators (PMIs) corresponding to analog beams, wherein each set of R sets of PMIs corresponds to an analog beam of the analog beams associated with the R CSI-RS resources, identify, based on a channel estimation operation, a set of digital beams corresponding to each of the analog beams, identify a set of hybrid beams corresponding to each of the R CSI-RS resources, wherein the set of the hybrid beams comprises the set of digital beams and the analog beam, respectively, and identify a subset of the set of hybrid beams using an index to generate a PMI and (ii) analog beams, wherein the transceiver is further configured to transmit a CSI report including (1) the PMI and (ii) the subset of the set of hybrid beams.

In another embodiment, a method of a UE is provided. The method comprises: receiving information for (i) an analog beam and (ii) R CSI-RS resources; constructing, based on the information for the analog beam, an analog beam codebook; deriving, based on the analog beam codebook and measurement of R CSI-RS resources, R sets of PMIs corresponding to analog beams, wherein each set of R sets of PMIs corresponds to an analog beam of the analog beams associated with the R CSI-RS resources; identifying, based on a channel estimation operation, a set of digital beams corresponding to each of the analog beams; identifying a set of hybrid beams corresponding to each of the R CSI-RS resources, wherein the set of the hybrid beams comprises the set of digital beams and the analog beam, respectively; identifying a subset of the set of hybrid beams using an index to generate a PMI corresponding to the analog beams; and transmitting a CSI report including (i) the PMI and (ii) the subset of the set of hybrid beams.

In yet another embodiment, a base station (BS) is provided. The BS comprises a processor. The BS further comprises a transceiver operably coupled to the processor, the transceiver configured to: transmit information for (i) an analog beam and (ii) R CSI-RS resources, and receive a CSI report including (i) a PMI and (ii) a subset of a set of hybrid beams, wherein: an analog beam codebook is constructed based on the information for the analog beam, an R sets of PMIs corresponding to analog beams is derived based on the analog beam codebook and measurement of the R CSI-RS resources, each set of the R sets of PMIs corresponding to an analog beam of the analog beams associated with the R CSI-RS resources, a set of digital beams corresponding to each of the analog beams is identified based on a channel estimation operation, a set of hybrid beams corresponding to each of the R CSI-RS resources is identified, the set of the hybrid beams comprising the set of digital beams and the analog beam, respectively, and the subset of the set of hybrid beams is identified using an index to generate a R PMI corresponding to the analog beams.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
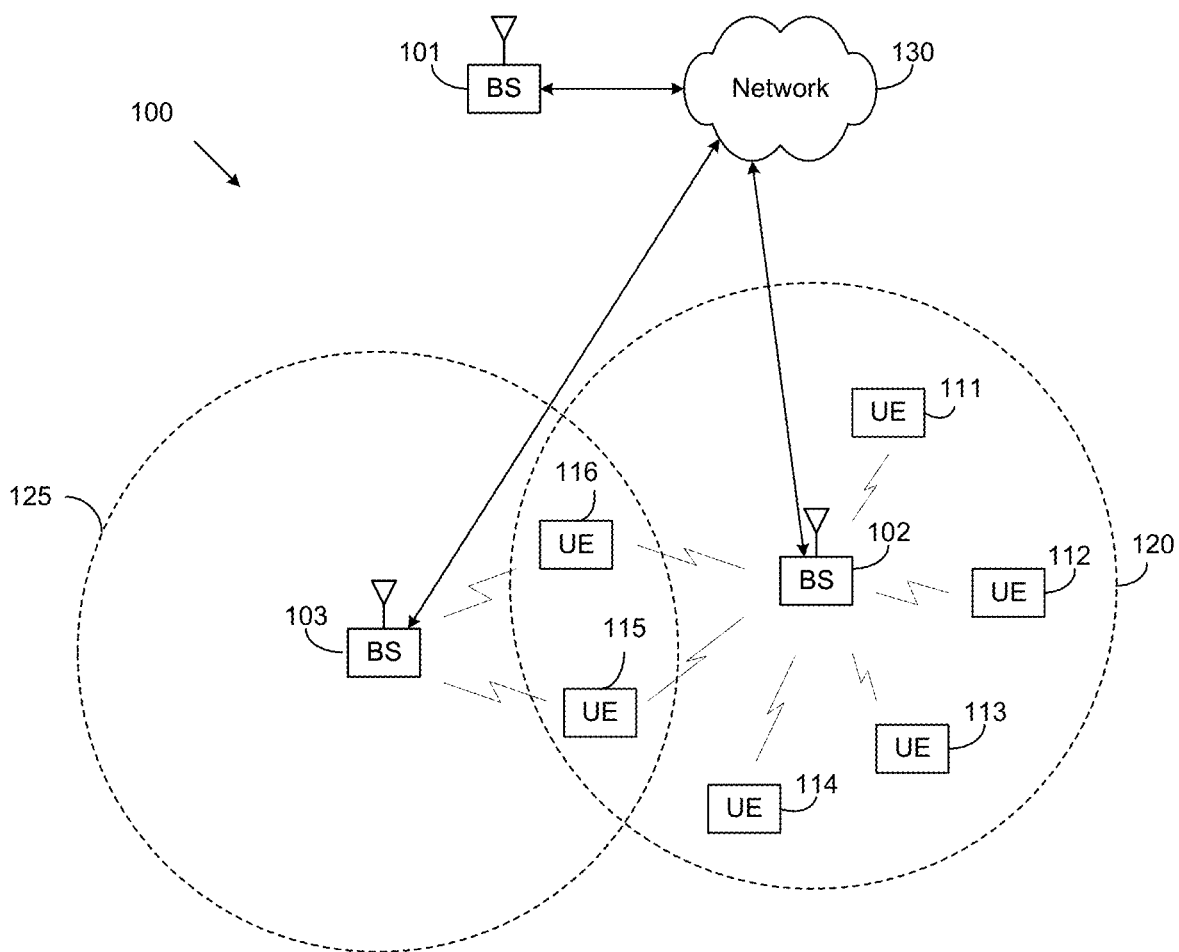
FIG. 1 illustrates an example of wireless network according to embodiments of the present disclosure.
Figure 2:
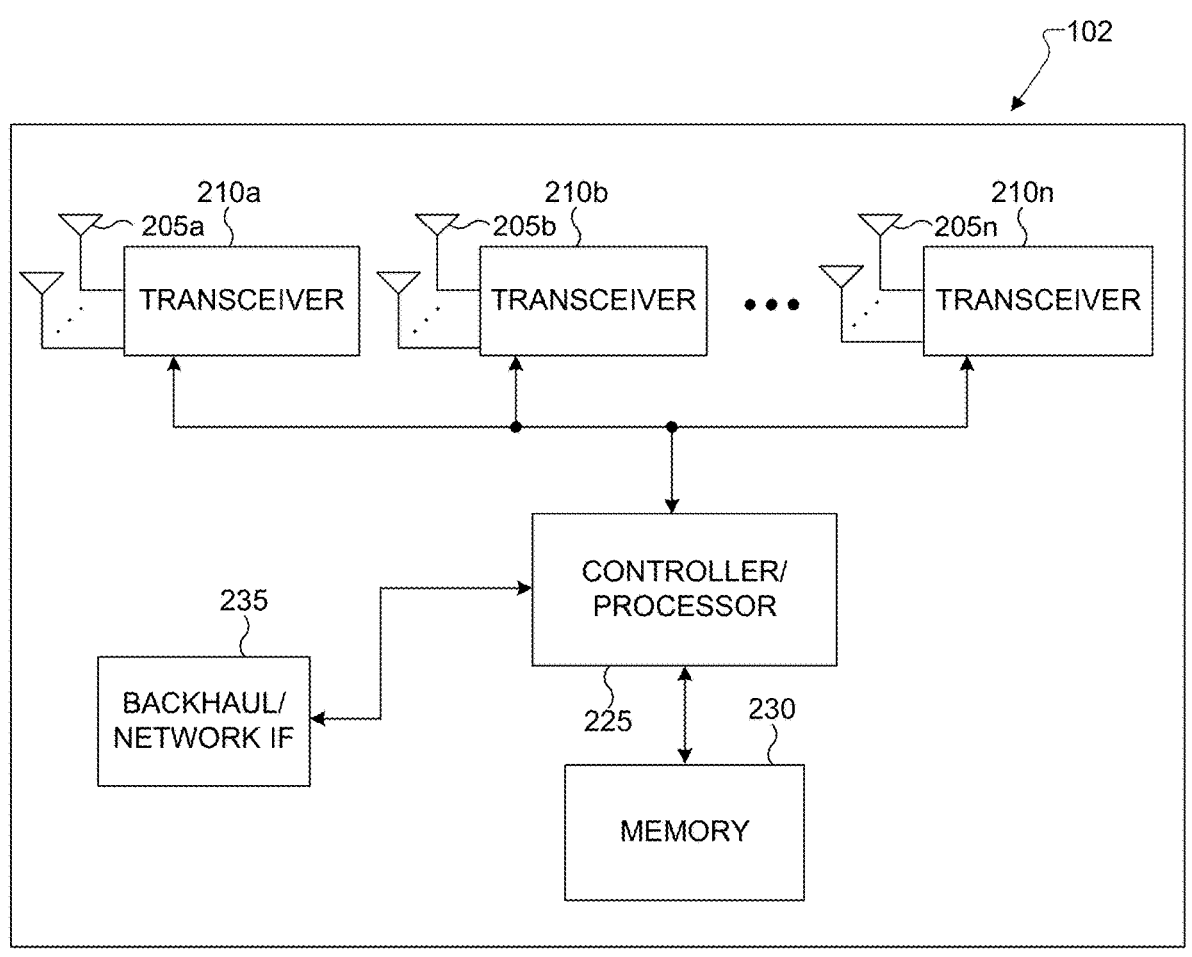
FIG. 2 illustrates an example of gNB according to embodiments of the present disclosure.
Figure 3:
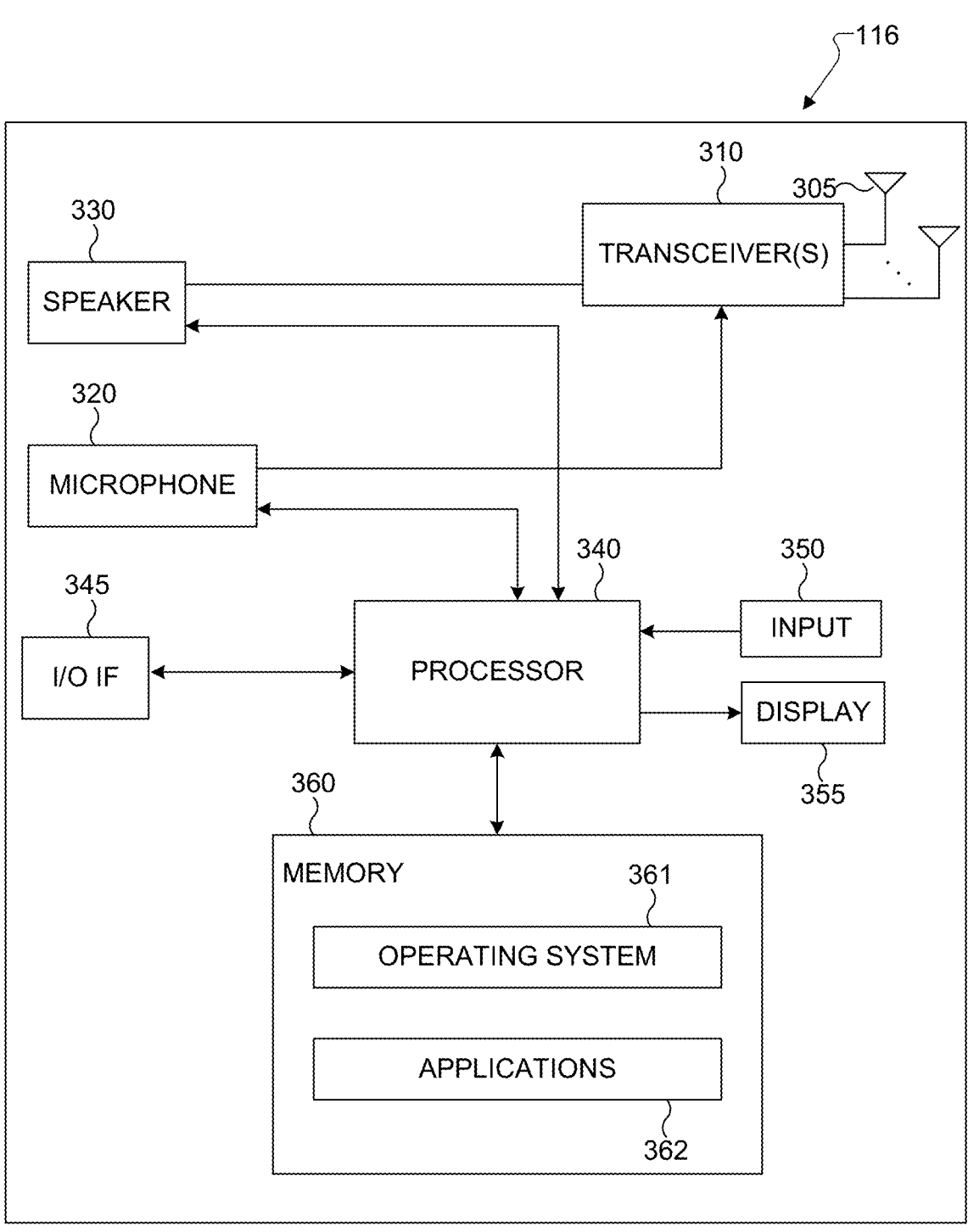
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for CSI reporting in advanced MIMO antenna systems in a wireless communication system. In certain embodiments, and one or more of the gNBs 101-103 includes circuitry, programing, or a combination thereof, to support CSI reporting in advanced MIMO antenna systems in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support CSI reporting in advanced MIMO antenna systems in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for CSI reporting in advanced MIMO antenna systems in a wireless communication system.

The processor 340 can move data into or out of the memory 360 as required by an executing process. In some embodiments, the processor 340 is configured to execute the applications 362 based on the OS 361 or in response to signals received from gNB s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355m which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
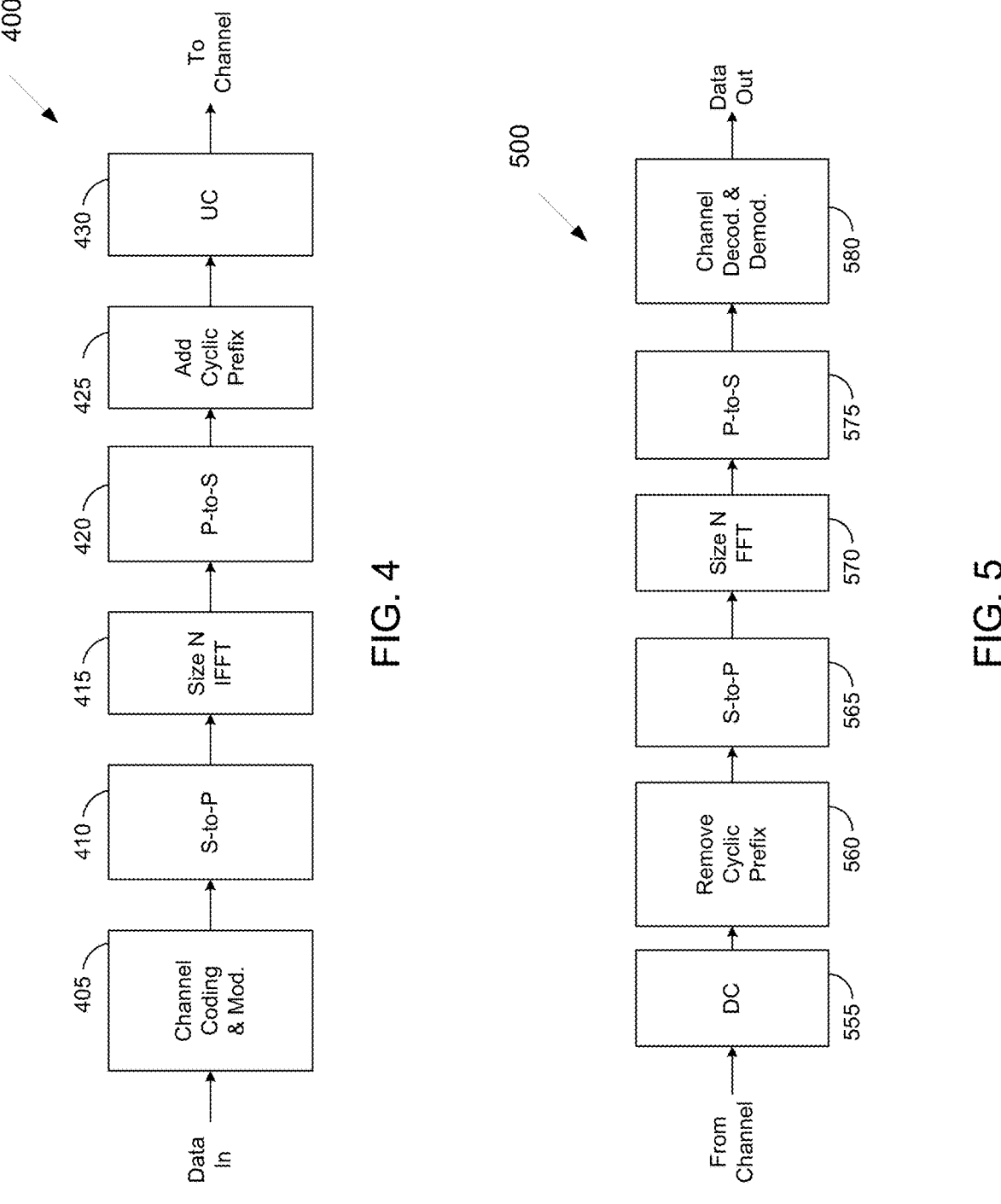
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support CSI reporting in advanced MIMO antenna systems in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a TCI state of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including CSI-RS and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as a radio resource control (RRC) signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
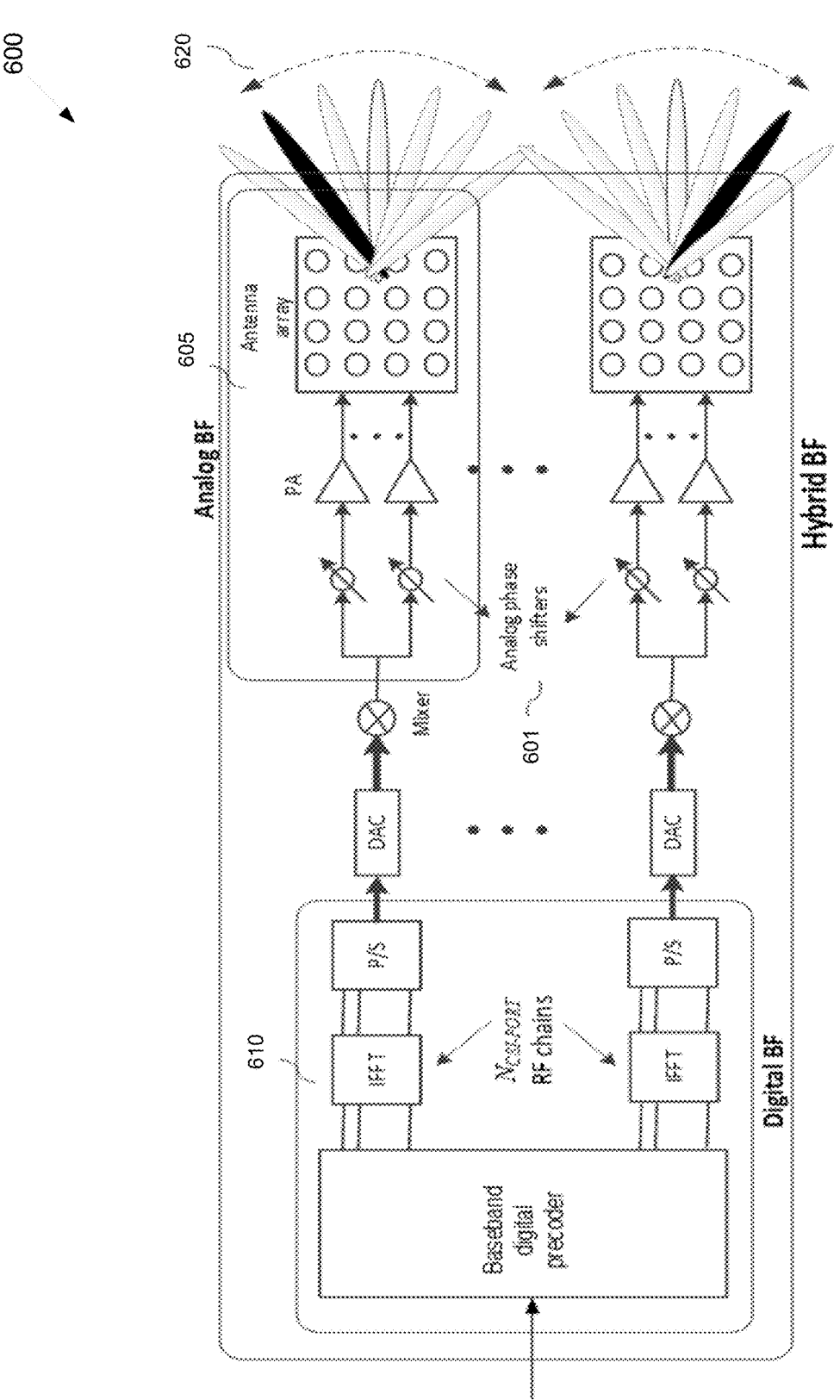
FIG. 6 illustrates an example of antenna structure according to embodiments of the present disclosure.

FIG. 6 illustrates an example antenna structure 600 according to embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSR\text{-}PORT}$. A digital beamforming unit 610 performs a linear combination across $N_{CSI\_PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss@100 m distance), larger number of and sharper analog beams (hence larger number of radiators in the array) may be needed to compensate for the additional path loss.

Figure 7:
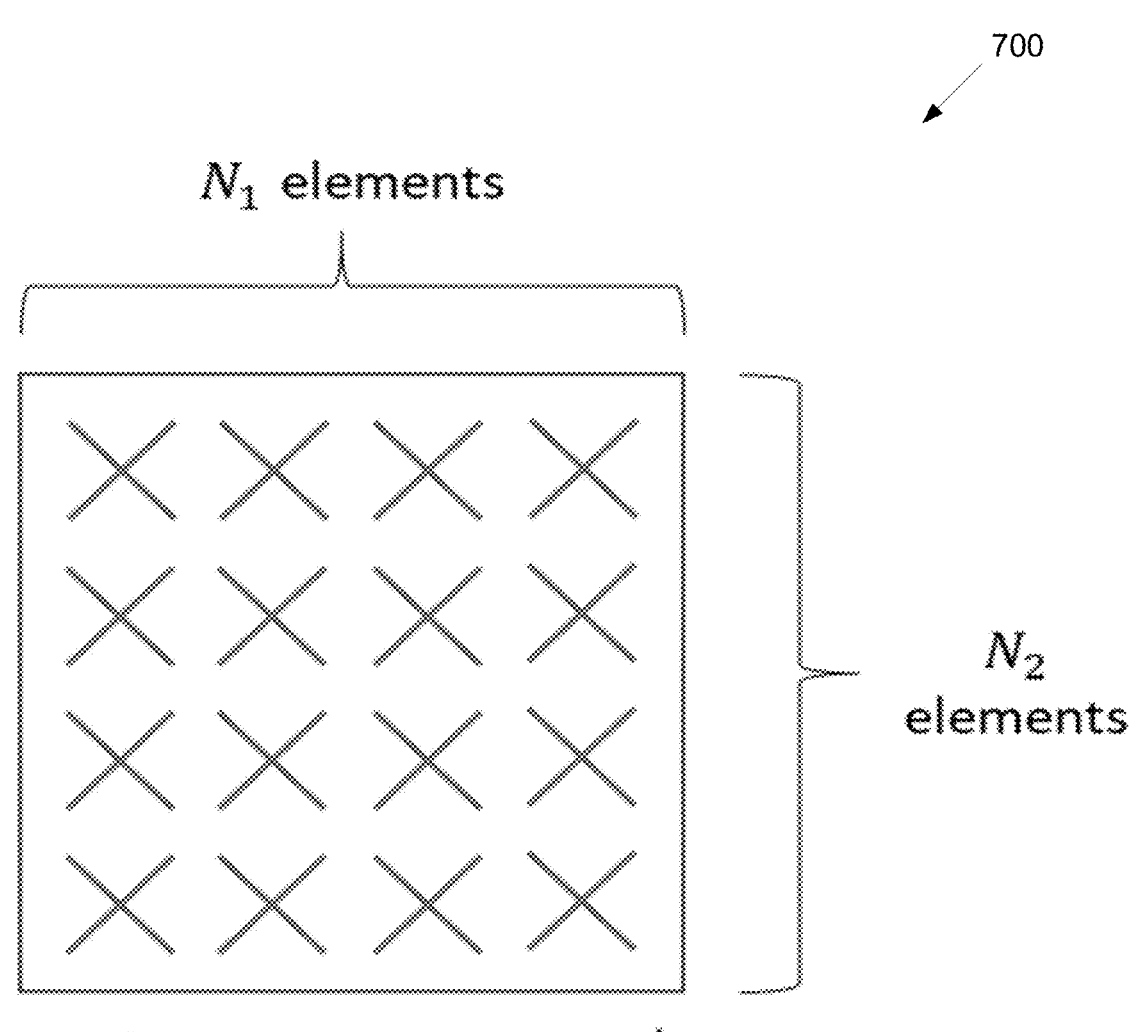
FIG. 7 illustrates an example of antenna panel at a BS according to embodiments of the present disclosure.

FIG. 7 illustrates an example of antenna panel at a BS 700 according to embodiments of the present disclosure. An embodiment of the antenna panel at a BS 700 shown in FIG. 7 is for illustration only.

FIG. 7 depicts an antenna panel at a BS comprising $N_1 N_2$ cross-polarized antenna elements. The total number of antenna elements counting polarizations is $N_T = 2N_1 N_2$. In the current CSI reporting framework, a UE measures the downlink channel vector $h^{(N_T \times 1)}$ across $N_T$ antenna elements through periodic, semi-persistent, or aperiodic CSI-RS transmissions in the downlink as illustrated in 3GPP standard specification and reports the optimal precoder to the BS using UCI (uplink control information) signaling as illustrated in 3GPP standard specification. The precoder may be constructed as a combination of DFT beams defined by the quantities:

$$u_m = \begin{cases} \left(1 \ e^{j\frac{2\pi m}{O_2 N_2}} \ \dots \ e^{j\frac{2\pi m(N_2-1)}{O_2 N_2}}\right)^T, & N_2 > 1 \\ 1, & N_2 = 1 \end{cases}$$

and $$v_{l,m} = \left(1 \ e^{j\frac{2\pi l}{O_1 N_1}} \ \dots \ e^{j\frac{2\pi l(N_1-1)}{O_1 N_1}}\right)^T \otimes u_m,$$

where the Kronecker product $v \otimes w$ between vectors $v := [v_0 \ v_0 \ \dots \ v_{N-1}]^T$ and $w := [w_0 \ w_1 \ \dots \ w_{K-1}]^T$ is defined as the N·K-dimensional vector $v \otimes w := [v_0 w^T \ v_1 w^T \ \dots \ v_{N-1} w^T]^T$ and the indices $l \in \{0, \dots, N_1 O_1 - 1\}$ and $m \in \{0, \dots, N_2 O_2 - 1\}$ identify the beam in a DFT beam codebook. The values of $N_1$ and $N_2$ are configured through RRC signaling, with the parameter n1-n2 in the codebook configuration information element (CodebookConfig IE) illustrated in 3GPP standard specification and each value of the $(N_1, N_2)$ tuple corresponds to only one value of $(O_1, O_2)$.

Figure 8:
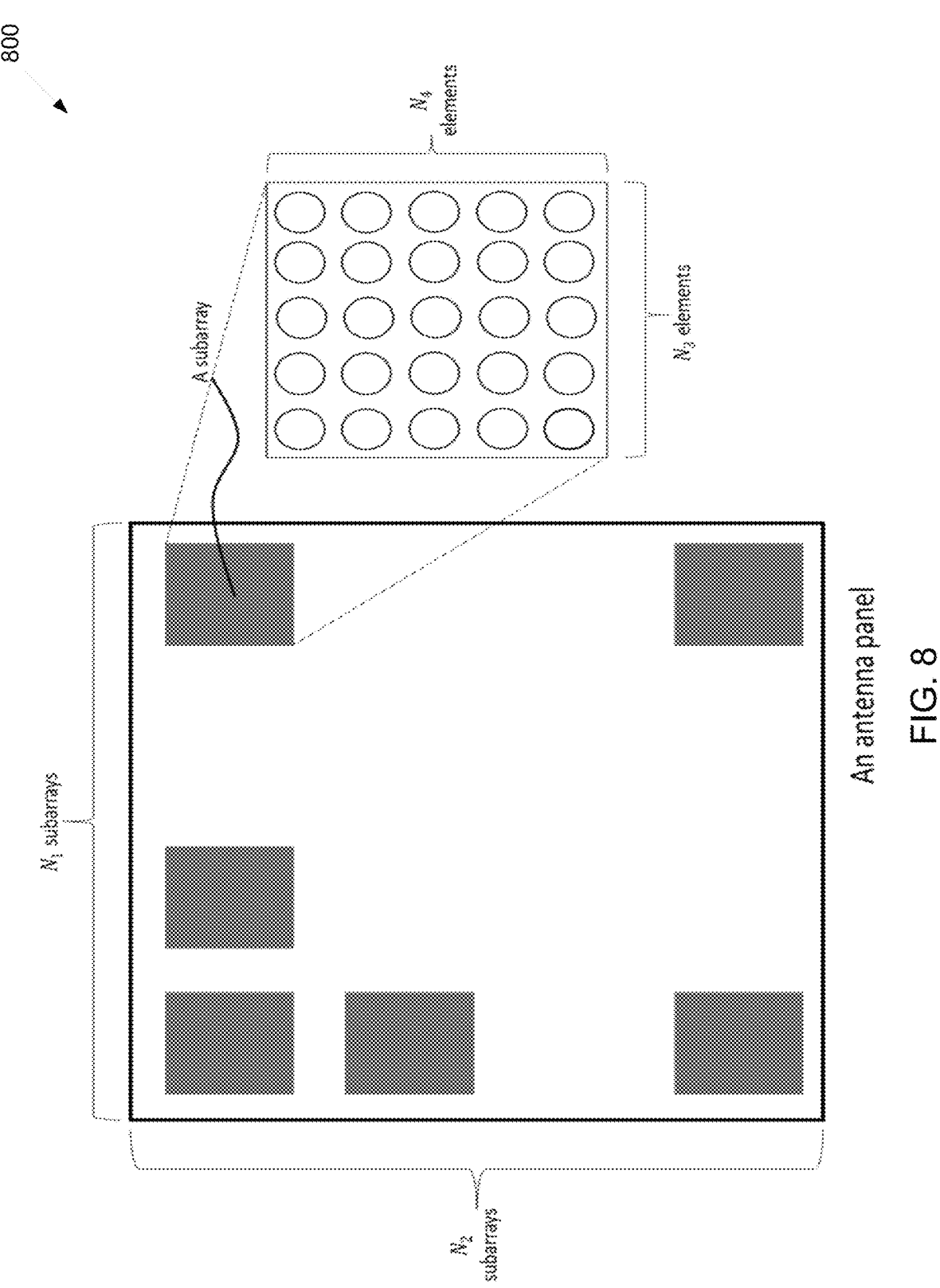
FIG. 8 illustrates an example of antenna panel comprising $N_1N_2$ subarrays per polarization dimension according to embodiments of the present disclosure.

FIG. 8 illustrates an example of antenna panel comprising $N_1 N_2$ subarrays per polarization dimension 800 according to embodiments of the present disclosure. An embodiment of the antenna panel comprising $N_1 N_2$ subarrays per polarization dimension 800 shown in FIG. 8 is for illustration only.

Figure 9:
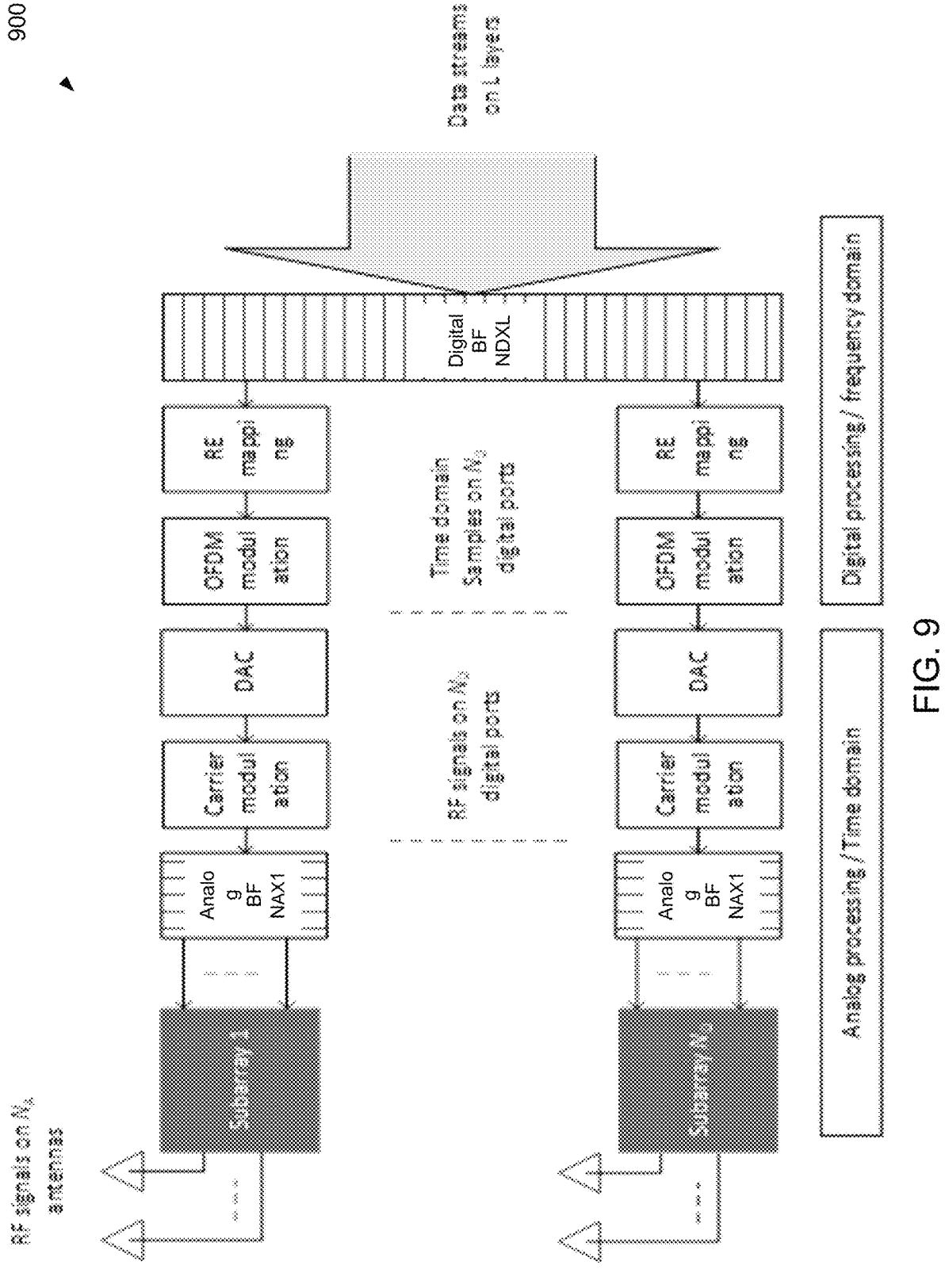
FIG. 9 illustrates an example of RF frontend and baseband according to embodiments of the present disclosure.

FIG. 8 depicts an antenna panel comprising $N_1 N_2$ subarrays per polarization dimension, each of which consists of $N_A = N_3 N_4$ antenna elements. $N_D = 2N_1 N_2$ is the number of subarrays. Digital beamforming is performed across $N_D$ subarrays and each of the resulting $N_D$ data steams go through analog beamforming at one subarray, with the same analog beam used at every subarray. FIG. 9 depicts the RF frontend and baseband implementation for this architecture.

FIG. 9 illustrates an example of RF frontend and baseband 900 according to embodiments of the present disclosure. An embodiment of the RF frontend and baseband 900 shown in FIG. 9 is for illustration only.

In the 5G-advanced or 6G communications, extremely large number of antennas (e.g., $N_T = 2048$) and large number of subarrays (e.g., $N_D = 128$) are expected to be used. Analog beamforming is performed across each subarray, and digital beamforming is performed across subarrays, with each subarray abstracted into 1 digital port. In this context, existing CSI reporting mechanisms as illustrated in 3GPP standard specification may no longer be sufficient and may lead to large UCI signaling overheads.

Secondly, PMI indication using Type I Multi-Panel codebook as illustrated in 3GPP standard specification uses the same beam across multiple panels, along with inter-panel co-phasing factors. This may be insufficient for proper coverage when the number of antenna elements and subarrays become large.

Therefore, CSI reporting with sufficient granularity at a reasonable UCI signaling cost is critical to obtaining sufficiently accurate channel estimates and thereby realizing MU-MIMO performance through appropriate beamforming.

The present disclosure provides a new CSI measurement and reporting procedure adapted to large antenna arrays at the BS, utilizing multiple CSI-RS resources for each CSI report.

Following are the key aspects involved in the CSI measurement and reporting: (1) a network indicates the analog beam codebook to the UE via RRC signaling, by appending extra information to CodebookConfig IE as illustrated in 3GPP standard specification; (2) the UE constructs analog beam codebook similar to as 3GPP standard specification; (3) a network indicates analog beam to the UE for each CSI-RS resource: (i) for periodic or semi-persistent CSI, analog beam indication is performed semi-statically through RRC signaling, by appending extra information to CodebookConfig IE, and (ii) for aperiodic CSI, analog beam indication is performed dynamically using additional codepoint in DCI 0_1. For both cases 3a and 3b, the value of R will be indicated in a CSI report configuration information element (CSI-ReportConfig IE); (4) the UE derives PMI on R analog beams based on R CSI-RS measurements. PMI measurement on each analog beam is performed using one CSI-RS resource; (5) the UE downsamples the measured PMIs for reporting and generates one report combining all R CSI-RS measurements; (6) the UE performs CQI measurements based on reported PMI; (7) the UE reports PMI and CQI; and (8) wideband/subband measurement and reporting may be performed as an additional dimension in accordance with current specifications.

Figure 10:
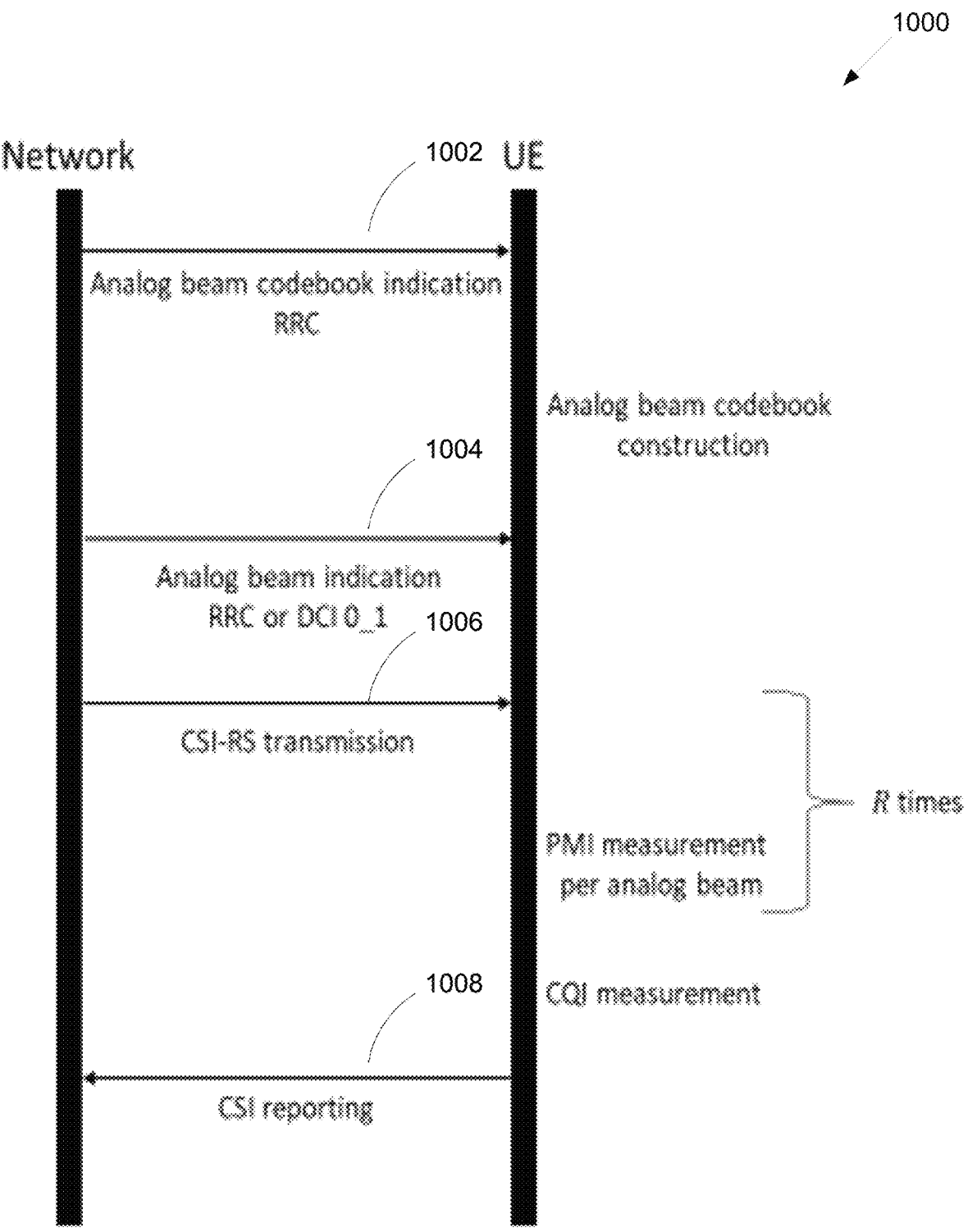
FIG. 10 illustrates a signaling flow for CSI measurement and reporting according to embodiments of the present disclosure.

FIG. 10 illustrates a signaling flow 1000 for CSI measurement and reporting according to embodiments of the present disclosure. The signaling flow 1000 as may be performed by a UE (e.g., 111-116 as illustrated in FIG. 1) and a BS (e.g., 101-103 as illustrated in FIG. 1). An embodiment of the signaling flow 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, in step 1002, a network (e.g., BS 101-103 as illustrated in FIG. 1) sends an analog beam codebook indication RRC to a UE (e.g., 11-116 as illustrated in FIG. 1). In step 1004, the network sends an analog beam indication RRC or DCI 0_1 to the UE. In step 1006, the network sends CSI-RS to the UE. In step 1008, the UE sends the CSI report to the network.

In the present disclosure, an analog beam codebook indication is provided. An analog beam codebook is indicated by network to a UE through CodebookConfig IE, by configuring the parameters $N_3$, $N_4$, $O_3$, and $O_4$. The values of $N_3$ and $N_4$ are configured with the parameter n3-n4 in CodebookConfig IE and each value of the $(N_3, N_4)$ tuple corresponds to one or more values of $(O_3, O_4)$, which are configured with the parameters o3 and o4 in CodebookConfig IE. In certain network implementations, $N_3$ and $N_4$ correspond to the numbers of phase-tunable elements in $1^{st}$ and $2^{nd}$ dimensions comprising each subarray.

In the present disclosure, an analog beam codebook construction by UE is provided. Based on the CodebookConfig IE (i.e., $N_3$, $N_4$, $O_3$, and $O_4$), a UE constructs analog beam codebook as described here.

The quantities $w_m$ and $a_{l,m}$ are given by:

$$w_m = \begin{cases} \left(1 \quad e^{j\frac{2\pi m}{O_4 N_4}} \quad \dots \quad e^{j\frac{2\pi m(N_4-1)}{O_4 N_4}}\right)^T, N_4 > 1 \\ 1, N_4 = 1 \end{cases}$$

and $$a_{l,m} = \left(1 \quad e^{j\frac{2\pi l}{O_3 N_3}} \quad \dots \quad e^{j\frac{2\pi l(N_3-1)}{O_3 N_3}}\right)^T \otimes w_m.$$

The analog beam codebook consists of the beams $a_{l,m}$, out of which R orthogonal beams will be selected by the network, each corresponding to one CSI-RS resource.

In the present disclosure, an analog beam indication through RRC signaling is provided. For periodic or semi-persistent CSI, an indication of R orthogonal analog beams is performed semi-statically. The analog beams are given by $\{a_{O_3 n_3^r + i_{3,2} O_4 n_4^r + i_{3,3}}, r=0, \dots, R-1\}$. Here, the common offsets $i_{3,2} \in \{0, \dots, O_1-1\}$ and $i_{3,3} \in \{0, \dots, O_4-1\}$ are configured using the fields analogBeamOffset0 and analogBeamOffset1, respectively, in CodebookConfig IE, and $(N_3^0, n_4^0), \dots, (n_3^{R-1}, n_4^{R-1})$ are communicated through the index $$i_{3,1} \in \left\{0, 1, \dots, \binom{N_3 N_4}{R} - 1\right\}$$

and configured using the field analogBeamSubset in CodebookConfig IE.

In the present disclosure, an analog beam indication through DCI 0_1 is provided. For aperiodic CSI, analog beam is indicated by the analog beam indicator field in DCI 0_1. The set of candidate beams is signaled through the optional field n3-n4-analogBeamList, which consists of a list of candidate values of $(n_3^r, n_4^r)$. A specific $(n_3^r, n_4^r)$ pair is indicated using a codepoint in DCI. The configured offsets $i_{3,2}$ (analogBeamOffset0) and $i_{3,3}$ (analogBeamOffset1) are then used to determine a specific analog beam.

As an example, a list of candidates for $(n_3^r, n_4^r)$ can be (0,0), (1,0), (0,1), (1,1), out of which a specific choice can be indicated using a 2-bit codepoint in DCI 0_1.

In the present disclosure, an example of analog beam candidate indication using n3-n4-analogBeamList in CodebookConfig IE is provided.

A UE may expect CSI-RS in the same downlink time slot as indicated by DCI 0_1 and CSI-RS is beamformed according to indicated analog beam index. A UE CSI report is generated using the aperiodic CSI-RS.

In the present disclosure, multiple CSI-RS resources in each CSI report is provided. The UE constructs each CSI report by processing CSI-RS measurements, where the CSI-RS is received on R CSI-RS resources. CSI-ReportConfig IE is therefore enhanced to include multiple CSI-ResourceConfig IEs for channel measurement as shown in TABLE 1.

TABLE 1

| CSI-ResourceConfig IEs for channel measurement |
| --- |
| CSI-ReportConfig ::= SEQUENCE { <br> reportConfigId CSI-ReportConfigId, <br> ... <br> numAnalogBeams ENUMERATED { one, two, four, eight, sixteen }, <br> resourcesForChannelMeasurement SEQUENCE (SIZE <br> (1..numAnalogBeams)) OF CSI-ResourceConfigId, <br> ... <br> } |

In the present disclosure, UE measurement of PMI on one analog beam using each CSI-RS resource is provided. Let $h^{(1 \times N_T)}$ be the baseband equivalent digital channel across all $N_T = N_A N_D$ antennas. Given analog beam $a^{(N_A \times 1)}$, the effective digital channel across $N_D$ digital ports is $$\tilde{h}_a^{(1 \times N_D)} = h \begin{pmatrix} a & 0 & \cdots & 0 \\ 0 & a & \cdots & 0 \\ \vdots & \vdots & \ddots & \vdots \\ 0 & 0 & \cdots & a \end{pmatrix} = h(I_{N_D} \otimes a).$$

The UE measures the effective digital channel $\tilde{h}_a$ a for each analog beam a using one CSI-RS resource. Based on the estimates of $\tilde{h}_{a_0}, \ldots, \tilde{h}_{a_{R-1}}$ on R CSI-RS resources, the UE constructs a channel estimate $\hat{h}$.

In the present disclosure, digital beam selection from measurement across R configured CSI-RS resources is provided. The value of L, the total number of digital beams the UE may report based on CSI measurement across R CSI-RS resources, is indicated to the UE through the field numberOfDigitalBeams in CodebookConfig IE. Accordingly, the UE considers $N_1 N_2$ digital beams for CSI reporting when measuring channels per CSI-RS resource. The UE conducts such CSI measurements across R CSI-RS resources. Then UE selects L digital beams out of $RN_1 N_2$ digital beams measured across R CSI-RS resources, for which $$\binom{RN_1 N_2}{L}$$

candidate combinations are available. The numbers of beams selected on different CSI-RS resources can be different, and they are denoted as $L_r$. The choice of $L_r$ is constrained according to higher-layer configured value of L, and $L = \sum_{r=0}^{R-1} L_r$.

In the present disclosure, down sampling and PMI reporting are provided. Let $a_r$ be the analog beam corresponding to CSI-RS resource $r \in \{0, \ldots, R-1\}$. Based on the estimated channel, the UE approximates the optimal digital precoder corresponding to analog beam a r as a linear combination of digital beams $d_{p,r}$ in the form:

$$B_r = \begin{pmatrix} \sum_{p=0}^{L_r-1} \alpha_{p,r}^{(0)} d_{p,r} \\ \sum_{p=0}^{L_r-1} \alpha_{p,r}^{(1)} d_{p,r} \end{pmatrix},$$

where $L_r \leq N_1 N_2$ is the number of UE selected digital beams per polarization, corresponding to CSI-RS resource r (i.e., analog beam $a_r$), and the superscripts 0 and 1 correspond to two different polarizations.

Since the same analog precoder $a_r$ is used for all subarrays for CSI-RS resource r, the overall precoder corresponding to CSI-RS resource r is given by:

$$B_r \otimes a_r = \begin{pmatrix} \sum_{p=0}^{L_r-1} \alpha_{p,r}^{(0)} (d_{p,r} \otimes a_r) \\ \sum_{p=0}^{L_r-1} \alpha_{p,r}^{(1)} (d_{p,r} \otimes a_r) \end{pmatrix}.$$

The set of selected hybrid beams across CSI-RS resources is $\{d_{p,r} \otimes a_r, p=0, \ldots, L_r-1, r=0, \ldots, R-1\}$.

The set of selected digital beams per polarization is $\{d_{p,r}, p=0, \ldots, L_r-1, r=0, \ldots, R-1\} \equiv \{v_{O_1 n_1^{(r,\ p)}+i_{4,2,r}, O_2 n_2^{(r,p)}+i_{4,3,r}}, p=0, \ldots, L_r-1, r=0, \ldots, R-1\}$, where $v_{p,m}$ is defined as follows:

$$u_m = \begin{cases} \left(1 \ e^{j\frac{2\pi m}{O_2 N_2}} \ \ldots \ e^{j\frac{2\pi m(N_2-1)}{O_2 N_2}}\right)^T, & N_2 > 1 \\ 1, & N_2 = 1 \end{cases}$$

and $$v_{p,m} = \left(1 \ e^{j\frac{2\pi p}{O_1 N_1}} \ \ldots \ e^{j\frac{2\pi p(N_1-1)}{O_1 N_1}}\right)^T \otimes u_m.$$

The UE may report the selected subset of hybrid analog-digital beams through exhaustive signaling, using the index $i_{4,1} \in \{0, 1, \ldots, \binom{RN_1 N_2}{L}-1\}$. The index $i_{4,1}$ is used to communicate the indices $\{(n_1^{(r,0)}, r_2^{(r,p)}), p=0, \ldots, L_r-1, r=0, R-1\}$, and the offsets $i_{4,2,r} \in \{0, \ldots, O_1-1\}$ and $i_{4,3,r} \in \{0, \ldots, O_2-1\}$ are communicated independently for each analog beam. The final beams are determined through the indices $(n_1^{(r,p)}, n_2^{(r,p)})$, $i_{4,2,r}$, and $i_{4,3,r}$, as depicted in FIG. 11.

Figure 11:
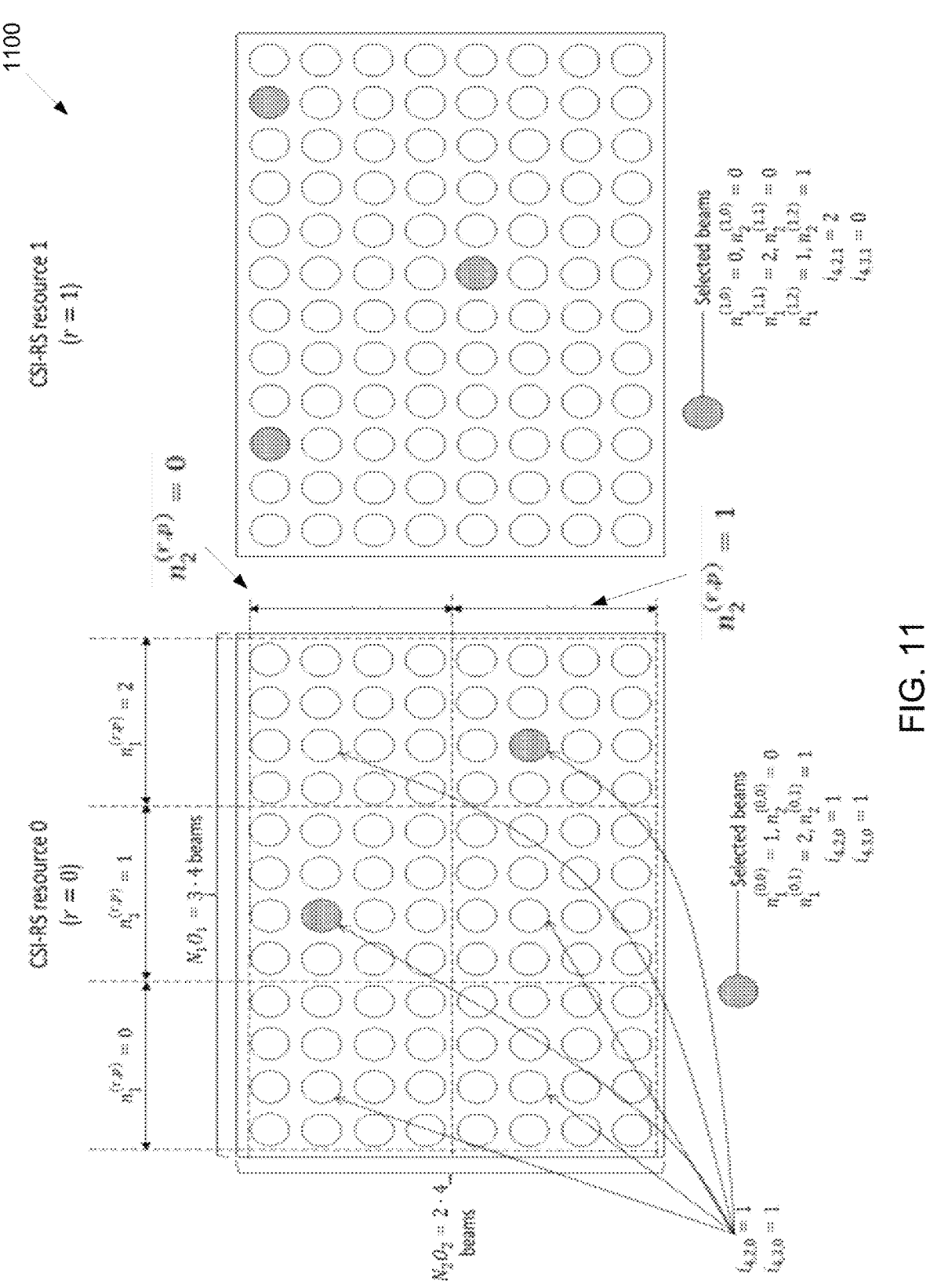
FIG. 11 illustrates an example of digital beams corresponding to each CSI-RS resource according to embodiments of the present disclosure.

FIG. 11 illustrates an example of digital beams corresponding to each CSI-RS resource 1100 according to embodiments of the present disclosure. An embodiment of the digital beams corresponding to each CSI-RS resource 1100 shown in FIG. 11 is for illustration only.

As illustrated in FIG. 11, the digital beams corresponding to each CSI-RS resource have the same offsets $((i_{4,2,0}, i_{4,3,0})=(1,1)$ and $(i_{4,2,1}, i_{4,3,1})=(2,0))$ and therefore, the selected digital beams corresponding to a given CSI-RS resource are orthogonal; however, the offsets for CSI-RS resource 0 and CSI-RS resource 1 are different (i.e., $(i_{4,2,0}, i_{4,3,0}) \neq (i_{4,2,1}, i_{4,3,1})$) and therefore, the digital beams corresponding to CSI-RS resource 0 are not orthogonal to those corresponding to CSI-RS resource 1.

Even though the selected digital beams for different analog beams (CSI-RS resources) are not required to be orthogonal, the corresponding hybrid beams are still orthogonal, since $(d_{p,r} \otimes a_r)^H (d_{p',r} \otimes a_r) = (d_{p,r}^H d_{p',r}) \otimes (a_r^H a_r) = 0$ whenever $a_r$ is orthogonal to $a_r$.

The UE may report the index of the strongest among the coefficients $\{(\alpha \alpha_{p,r}^{(0)}, \alpha_{p,r}^{(1)}), p=0, \ldots, L_r-1, r=0, \ldots, R-1\}$ using $i_{2,2} \in \{0,1, \ldots, 2L-1\}$, in order to use this coefficient as a reference.

The UE may report the amplitudes of the other 2L-1 selected coefficients relative to the strongest one using indices $i_{2,3,p} \in \{0,1, \ldots, 2^{B_{amp}}-1\}$, p=1, \ldots, 2L-1, where $B_{amp}$ is the number of bits for reporting each amplitude coefficient. The UE may report the phases of the coefficients using indices $i_{2,4,p} \in \{0,1, \ldots, 2^{B_{ph}}-1\}$, p=1, \ldots, 2L-1, where $B_{ph}$ is the number of bits for reporting each phase coefficient.

Figure 12:
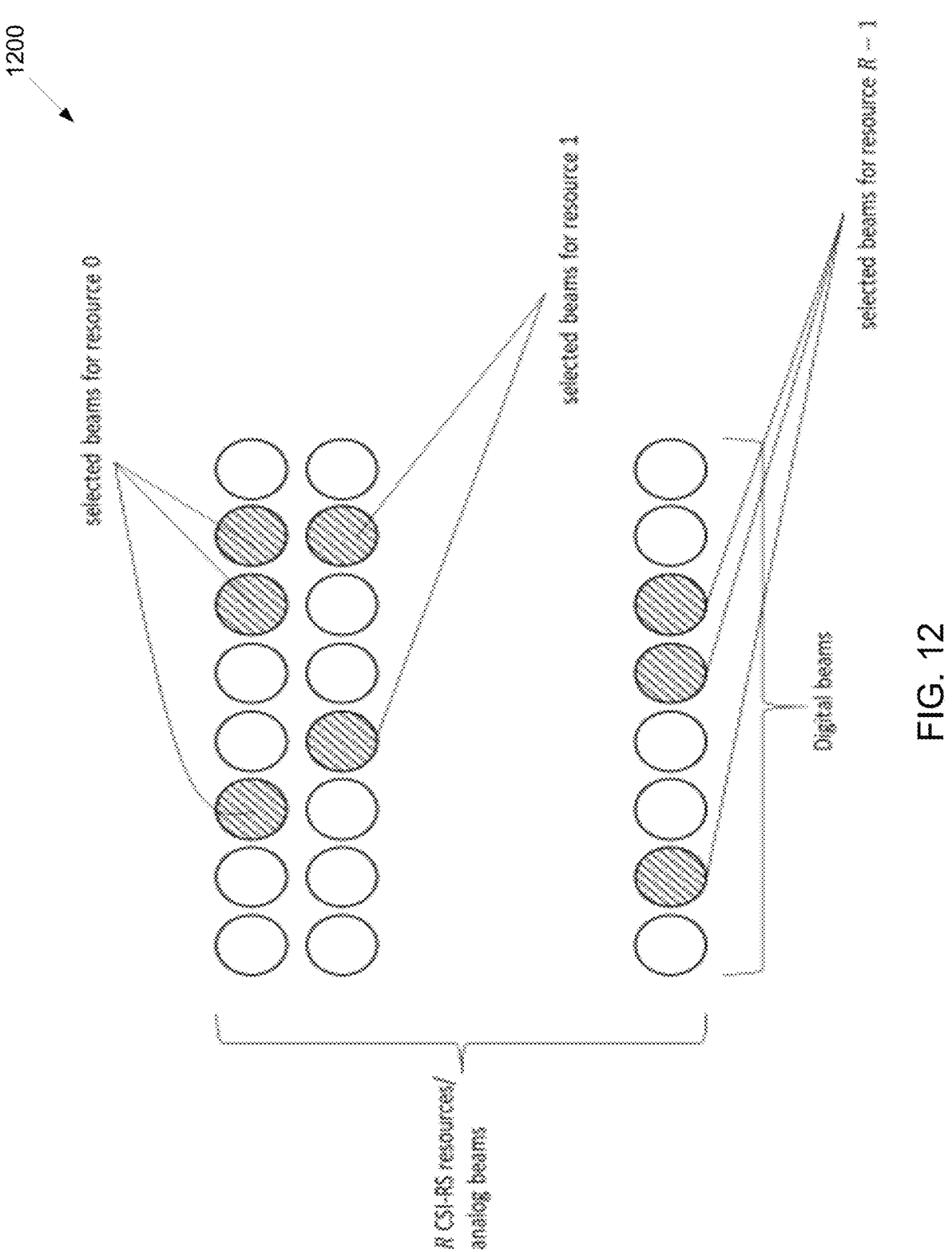
FIG. 12 illustrates an example of a subset of L digital beams selection per polarization across R CSI-RS resources according to embodiments of the present disclosure.

FIG. 12 illustrates an example of a subset of L digital beams selection per polarization across R CSI-RS resources 1200 according to embodiments of the present disclosure. An embodiment of the subset of L digital beams selection per polarization across R CSI-RS resources 1200 shown in FIG. 12 is for illustration only.

FIG. 12 illustrates the selection of a subset of L digital beams per polarization across R CSI-RS resources.

The various indices for combined down-sampled PMI reporting are summarized in TABLE 2.

TABLE 2

| Combined down-sampled PMI | | |
|---|---|---|
| Component | Index | Range |
| Beam subset | $i_{4,1}$ | $\left\{0, 1, \ldots, \binom{RN_1N_2}{L} - 1\right\}$ |
| Beam offsets | $i_{4,2,0}, \ldots, i_{4,2,R-1}$ | $\{0,1, \ldots, O_1 - 1\}$ |
| | $i_{4,3,0}, \ldots, i_{4,3,R-1}$ | $\{0,1, \ldots, O_2 - 1\}$ |

TABLE 2-continued

| Combined down-sampled PMI | | |
|---|---|---|
| Component | Index | Range |
| Strongest coefficient | $i_{2,2}$ | $\{0,1, \ldots, 2L - 1\}$ |
| Amplitude coefficient | $i_{2,3,1}, \ldots, i_{2,3,2L-1}$ | $\{0,1, \ldots, 2^{B_{amp}} - 1\}$ |
| Phase coefficient | $i_{2,4,1}, \ldots, i_{2,4,2L-1}$ | $\{0,1, \ldots, 2^{B_{ph}} - 1\}$ |

In the present disclosure, UE measurement of CQI is provided. For CQI measurement, the UE may assume that the BS uses the precoder indicated by the UE and the UE may measure CQI over all R CSI-RS resources.

For CSI-RS resource r, CQI is computed assuming the network uses the precoder $B_r$. In some embodiments, a UE may also assume that the network applies analog BF associated with the CSI-RS resource r.

In some embodiments, CQI corresponding to R CSI-RS resources (transmitted on R analog beams) is combined into a single CQI index. For combining multiple CQI indices into a single index, multiple methods can be considered. In one method, the UE may linearly average the CQI indices for different analog beams and round down to the nearest integer that corresponds to a CQI value. In another method, SINR averaging is performed across multiple CSI-RS resources and the averaged SINR is mapped to a CQI value.

The CQI table to be used is configured by the parameter cqi-Table in CSI-ReportConfig IE. Based on the embodiments, a sample CodebookConfig IE and a sample Analog-BeamID IE are constructed. TABLE 3 shows codebook configuration.

TABLE 3

| codebook configuration |
|---|

```
CodebookConfig ::= SEQUENCE {
codebookType CHOICE {
type1 SEQUENCE {
... ...
... ...
}
type2 SEQUENCE {
... ...
... ...
}
type3 SEQUENCE {
n3-n4 CHOICE {
four-two-TypeIII-AnalogBeamCodebook-Restriction BIT STRING (SIZE (128)),
four-four-TypeIII-AnalogBeamCodebook-Restriction BIT STRING (SIZE (256)),
...

...
o3 ENUMERATED {one, two, four},
o4 ENUMERATED {one, two, four},
n3-n4-analogBeamList SEQUENCE (SIZE (1..numAnalogBeams)) OF AnalogBeamId,
OPTIONAL
``` analogBeamSubset BIT STRING SIZE $\left(\left\lceil \log\left(\left\lceil\binom{N_3N_4}{R}\right\rceil\right)\right\rceil\right)$,

```
analogBeamOffset0 BIT STRING (SIZE ([log(O3)])),
analogBeamOffset1 BIT STRING (SIZE ([log(O4)])),
numberOfDigitalBeams ENUMERATED {four, eight, sixteen, thirty-two},
n1-n2 CHOICE {
four-four-TypeIII-DigitalBeamCodebook-Restriction BIT STRING (SIZE (256)),
eight-two-TypeIII-DigitalBeamCodebook-Restriction BIT STRING (SIZE (256)),
...
...
...
...
}
}
}
}
```

TABLE 4 shows analog beam ID.

TABLE 4

| Analog beam ID |
|---|

```
AnalogBeamId ::= SEQUENCE {
n3index ENUMERATED {zero, one},
n4index ENUMERATED {zero, one}
}
```

In the present disclosure, an analog beam indication through DCI 0_1 is provided. For aperiodic CSI, analog beam is indicated by the analog beam indicator field in DCI 0_1. As an alternative to the main embodiment, the set of candidate beams are signaled through the optional field o3-o4-analogBeamOffsetList, which consists of a list of candidate values of $(i_{3,2}, i_{3,3})$. A specific $(i_{3,2}, i_{3,3})$ pair is indicated using a codepoint in DCI. The analogBeamSubset parameter in CodebookConfig IE is then used to determine a set of R orthogonal analog beams.

As an example, a list of candidates for $(i_{3,2}, i_{3,3})$ can be (0,0), (1,0), (0,1), (1,1), out of which a specific choice can be indicated using a 2-bit codepoint in DCI 0_1.

A UE may expect CSI-RS in the same downlink time slot as indicated by DCI 0_1 and CSI-RS is beamformed according to indicated analog beam index. A UE CSI report is generated using the aperiodic CSI-RS.

A sample CodebookConfig IE based on this embodiment is presented in example of the present disclosure. TABLE 5 shows a codebook configuration.

TABLE 5

A codebook configuration

```
CodebookConfig ::= SEQUENCE {
codebookType CHOICE {
type1 SEQUENCE {
... ...
... ...
}
type2 SEQUENCE {
... ...
... ...
}
type3 SEQUENCE {
n3-n4 CHOICE {
four-two-TypeIII-AnalogBeamCodebook-Restriction BIT STRING (SIZE (128)),
four-four-TypeIII-AnalogBeamCodebook-Restriction BIT STRING (SIZE (256)),
...
...
o3 ENUMERATED {one, two, four},
o4 ENUMERATED {one, two, four},
o3-o4-analogBeamOffsetList SEQUENCE (SIZE (1..numAnalogBeams)) OF AnalogBeamId,
OPTIONAL
```

$$\text{analogBeamSubset BIT STRING SIZE } \left(\left\lceil \log\left(\left(\begin{array}{c} N_3 N_4 \\ R \end{array}\right)\right)\right\rceil\right),$$

```
analogBeamOffset0 BIT STRING (SIZE (⌈log(O₃)⌉)),
analogBeamOffset1 BIT STRING (SIZE (⌈log(O₄)⌉)),
numberOfDigitalBeams ENUMERATED {four, eight, sixteen, thirty-two},
n1-n2 CHOICE {
four-four-TypeIII-DigitalBeamCodebook-Restriction BIT STRING (SIZE (256)),
eight-two-TypeIII-DigitalBeamCodebook-Restriction BIT STRING (SIZE (256)),
...
...
...
...
  }
  }
  }
}
```

In the present disclosure, CQI reporting by UE is provided. The UE may report one CQI index per CSI-RS resource (i.e., analog beam). The CQI table to be used is configured by the parameter cqi-Table in CSI-ReportConfig IE. For CSI-RS resource r, CQI is computed with assuming the network uses the precoder $B_r$.

For eXtreme MIMO (X-MIMO) base station deployments with 1000s of antenna elements at the BS, the present disclosure helps the UE to report CSI with relatively low signaling overhead, under the framework of hybrid (digital/analog) beamforming.

Figure 13:
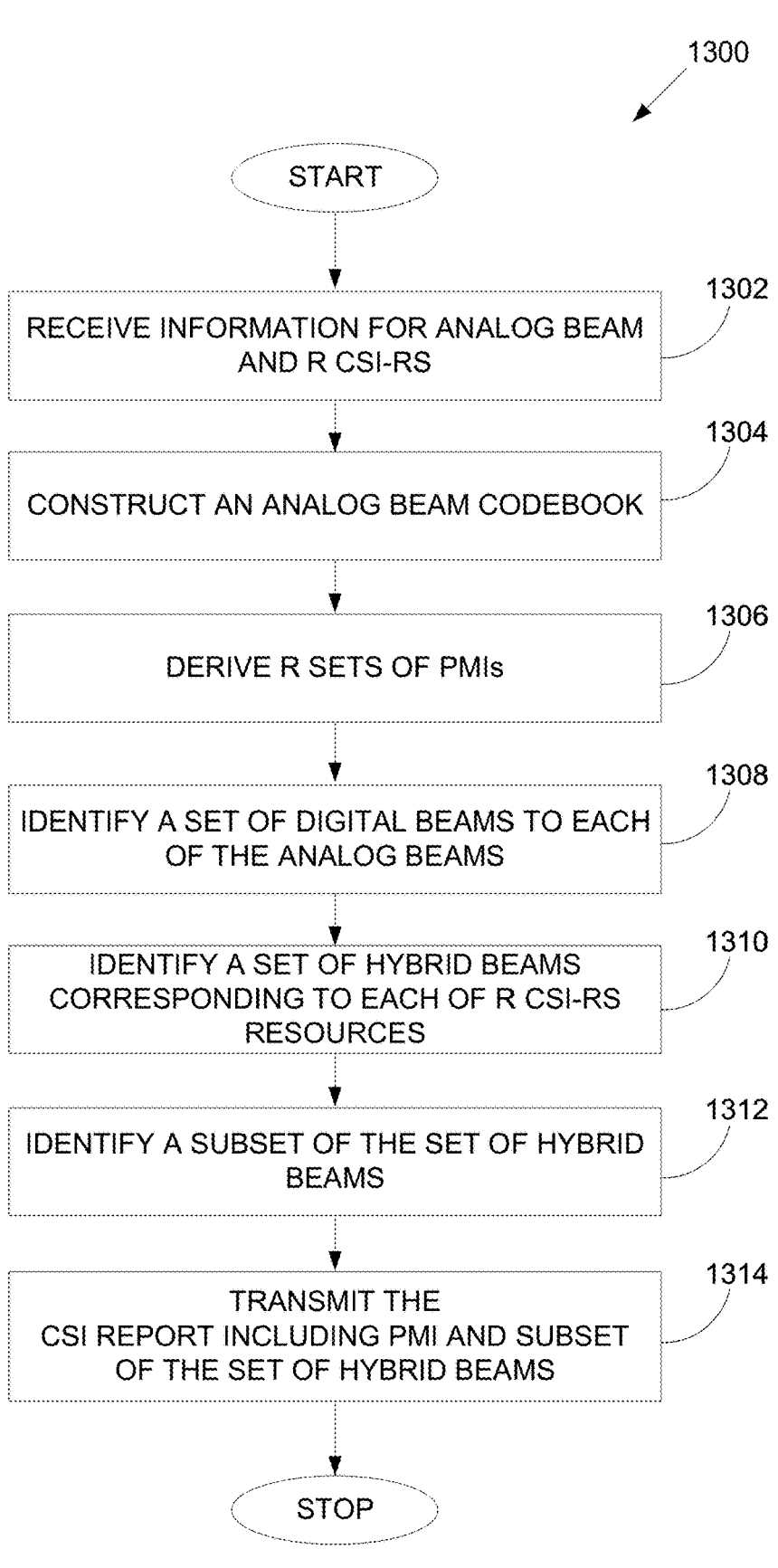
FIG. 13 illustrates a flowchart of method for UE according to embodiments of the present disclosure.

FIG. 13 illustrates a flowchart of method 1300 for UE according to embodiments of the present disclosure. The method 1300 as may be performed by a UE (e.g., 111-116 as illustrated in FIG. 1). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, the method 1300 begins at step 1302. In step 1302, a UE receives information for (i) an analog beam and (ii) an R CSI-RS resources.

In step 1304, the UE constructs, based on the information for the analog beam, an analog beam codebook.

In step 1306, the UE derives, based on the analog beam codebook and measurement of the R CSI-RS resources, R sets of pre-coding matrix indicators (PMIs) corresponding to analog beams, wherein each set of R sets of PMIs corre-sponds to an analog beam of the analog beams associated with the R CSI-RS resources.

In step 1308, The UE identifies, based on a channel estimation operation, a set of digital beams corresponding to each of the analog beams.

In step 1310, the UE identifies a set of hybrid beams corresponding to each of the R CSI-RS resources, wherein the set of the hybrid beams comprises the set of digital beams and the analog beam, respectively.

In step 1312, the UE identifies a subset of the set of hybrid beams using an index to generate a PMI corresponding to the analog beams.

In step 1314, the UE transmits a CSI report including (i) the PMI and (ii) the subset of the set of hybrid beams.

In one embodiment, the information for the analog beams is received via an RRC signal. In such embodiment, the information for the analog beam corresponds to a periodic or a semi-persistent CSU, and the RRC signal includes a CodebookConfig IE.

In one embodiment, the information for the analog beam is received via DCI. In such embodiment, the information for the analog beam corresponds to an aperiodic.

In such embodiment, the DCI includes a pair of indices for the aperiodic CSI and the pair of indices corresponds to the analog beam.

In one embodiment, the UE receives a CSI-ReportConfig IE including a value of R.

In one embodiment, a set of CQI corresponding to R CSI-RS resources is combined into a single CQI index, and the single CQI index includes multiple CQI indices.

In one embodiment, the UE linearly averages each of the multiple CQI indices for different analog beams and rounds down the linearly averaged each of the multiple CQI indices to a nearest integer that corresponds to a value of CQI; or averages signal to interference and noise ratio (SINR) across multiple CSI-RS resources and maps the averaged SINR to the value of CQI.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive information for (i) an analog beam and (ii) R channel state information-reference signal (R CSI-RS) resources; and
a processor operably coupled to the transceiver, the processor configured to:
construct, based on the information for the analog beam, an analog beam codebook,
derive, based on the analog beam codebook and measurement of the R CSI-RS resources, R sets of pre-coding matrix indicators (PMIs) corresponding to analog beams, wherein each set of R sets of PMIs corresponds to an analog beam of the analog beams associated with the R CSI-RS resources,
identify, based on a channel estimation operation, a set of digital beams corresponding to each of the analog beams,
identify a set of hybrid beams corresponding to each of the R CSI-RS resources, wherein the set of the hybrid beams comprises the set of digital beams and the analog beam, respectively, and
identify a subset of the set of hybrid beams using an index to generate a PMI corresponding to the analog beams, wherein the transceiver is further configured to transmit a CSI report including (i) the PMI and (ii) the subset of the set of hybrid beams.

2. The UE of claim 1, wherein:
the information for the analog beam is received via a radio resource control (RRC) signal;
the information for the analog beam corresponds to a periodic or a semi-persistent CSI; and
the RRC signal includes a codebook configuration information element (CodebookConfig IE).

3. The UE of claim 1, wherein:
the information for the analog beam is received via downlink control information (DCI); and
the information for the analog beam corresponds to aperiodic CSI.

4. The UE of claim 3, wherein:
the DCI includes a pair of indices for the aperiodic CSI; and
the pair of indices corresponds to the analog beam.

5. The UE of claim 1, wherein the transceiver is further configured to receive a CSI report configuration information element (CSI-ReportConfig IE) including a value of R.

6. The UE of claim 1, wherein:
a set of channel quality indicators (CQIs) corresponding to R CSI-RS resources is combined into a single CQI index; and
the single CQI index is based on multiple CQI indices.

7. The UE of claim 6, wherein the processor is further configured to:
linearly average each of the multiple CQI indices for different analog beams and round down the linearly averaged each of the multiple CQI indices to a nearest integer that corresponds to a value of the single CQI index; or
average signal to interference and noise ratio (SINR) across multiple CSI-RS resources and map the averaged SINR to the value of the single CQI index.

8. A method of a user equipment (UE), the method comprising:
receiving information for (i) an analog beam and (ii) R channel state information-reference signal (R CSI-RS) resources;
constructing, based on the information for the analog beam, an analog beam codebook;
deriving, based on the analog beam codebook and measurement of the R CSI-RS resources, R sets of pre-coding matrix indicators (PMIs) corresponding to analog beams, wherein each set of R sets of PMIs corresponds to an analog beam of the analog beams associated with the R CSI-RS resources;
identifying, based on a channel estimation operation, a set of digital beams corresponding to each of the analog beams;
identifying a set of hybrid beams corresponding to each of the R CSI-RS resources, wherein the set of the hybrid beams comprises the set of digital beams and the analog beam, respectively;
identifying a subset of the set of hybrid beams using an index to generate a PMI corresponding to the analog beams; and
transmitting a CSI report including (i) the PMI and (ii) the subset of the set of hybrid beams.

9. The method of claim 8, wherein:
the information for the analog beam is received via a radio resource control (RRC) signal;
the information for the analog beam corresponds to a periodic or a semi-persistent CSI; and

the RRC signal includes a codebook configuration information element (CodebookConfig IE).

10. The method of claim 8, wherein:
the information for the analog beam is received via downlink control information (DCI); and
the information for the analog beam corresponds to aperiodic CSI.

11. The method of claim 10, wherein:
the DCI includes a pair of indices for the aperiodic CSI; and
the pair of indices corresponds to the analog beam.

12. The method of claim 8, further comprising receiving a CSI report configuration information element (CSI-ReportConfig IE) including a value of R.

13. The method of claim 8, wherein:
a set of channel quality indicators (CQIs) corresponding to R CSI-RS resources is combined into a single CQI index; and
the single CQI index is based on multiple CQI indices.

14. The method of claim 13, further comprising:
linearly averaging each of the multiple CQI indices for different analog beams and rounding down the linearly averaged each of the multiple CQI indices to a nearest integer that corresponds to a value of the single CQI index; or
averaging signal to interference and noise ratio (SINR) across multiple CSI-RS resources and mapping the averaged SINR to the value of the single CQI index.

15. A base station (BS) comprising:
a processor; and
a transceiver operably coupled to the processor, the transceiver configured to:
transmit information for (i) an analog beam and (ii) R channel state information-reference signal (R CSI-RS) resources, and
receive a CSI report including (i) a pre-coding matrix indicator (PMI) and (ii) a subset of a set of hybrid beams,
wherein:
an analog beam codebook is constructed based on the information for the analog beam,
an R sets of PMIs corresponding to analog beams is derived based on the analog beam codebook and measurement of the R CSI-RS resources, each set of the R sets of PMIs corresponding to an analog beam of the analog beams associated with the R CSI-RS resources,

24 a set of digital beams corresponding to each of the analog beams is identified based on a channel estimation operation,
a set of hybrid beams corresponding to each of the R CSI-RS resources is identified, the set of the hybrid beams comprising the set of digital beams and the analog beam, respectively, and
the subset of the set of hybrid beams is identified using an index to generate a R PMI corresponding to the analog beams.

16. The BS of claim 15, wherein:
the information for the analog beam is transmitted via a radio resource control (RRC) signal;
the information for the analog beam corresponds to a periodic or a semi-persistent CSI; and
the RRC signal includes a codebook configuration information element (CodebookConfig IE).

17. The BS of claim 15, wherein:
the information for the analog beam is transmitted via downlink control information (DCI); and
the information for the analog beam corresponds to aperiodic CSI.

18. The BS of claim 17, wherein:
the DCI includes a pair of indices for the aperiodic CSI; and
the pair of indices corresponds to the analog beam.

19. The BS of claim 15, wherein the transceiver is further configured to transmit a CSI report configuration information element (CSI-ReportConfig IE) including a value of R.

20. The BS of claim 15, wherein:
a set of channel quality indicators (CQIs) corresponding to R CSI-RS resources is combined into a single CQI index;
in the single CQI index is based on multiple CQI indices; and
the processor is further configured to:
linearly average each of the multiple CQI indices for different analog beams and round down the linearly averaged each of the multiple CQI indices to a nearest integer that corresponds to a value of the single CQI index; or
average signal to interference and noise ratio (SINR) across multiple CSI-RS resources and map the averaged SINR to the value of single CQI index.

* * * * *